No. 745,335.   Patented December 1, 1903.

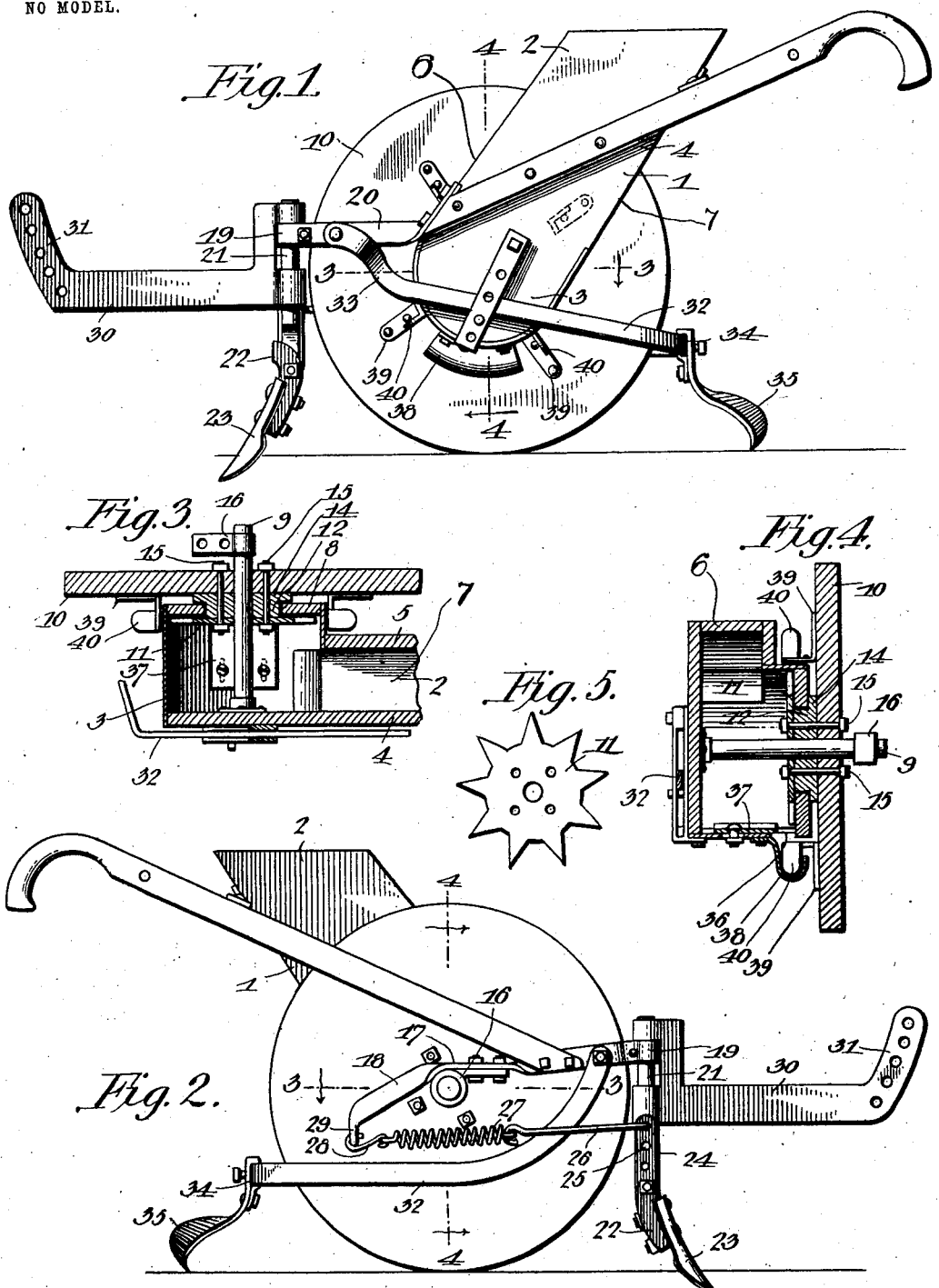

UNITED STATES PATENT OFFICE.

WILLIAM F. EDWARDS, OF COVINGTON, GEORGIA.

SEED-PLANTER AND FERTILIZER-DISTRIBUTER.

SPECIFICATION forming part of Letters Patent No. 745,335, dated December 1, 1903.

Application filed April 2, 1903. Serial No. 150,830. (No model.)

*To all whom it may concern:*

Be it known that I, WILLIAM F. EDWARDS, a citizen of the United States, residing at Covington, in the county of Newton and State of Georgia, have invented a new and useful Seed-Planter, of which the following is a specification.

My invention relates to combined seed-planters and fertilizer-distributers, and has for its objects to produce a device of this character which will be simple of construction, efficient in operation, one in which the amount of seed or fertilizer flowing from the hopper may be readily regulated, and one in which the distance between the hills may be varied at will according to circumstances.

To these ends the invention comprises the novel details of construction and combination of parts more fully hereinafter described.

In the accompanying drawings, Figure 1 is a side elevation of the device. Fig. 2 is a similar view as seen from the opposite side. Fig. 3 is a vertical transverse sectional elevation on the line 3 3 of Fig. 2. Fig. 4 is a horizontal section on the line 4 4 of Figs. 1 and 2. Fig. 5 is a detailed view of the agitator-disk.

Referring to the drawings, 1 indicates a hopper which preferably comprises an upper body portion 2 and a lower seed-chamber 3. The upper portion 2 may be of any suitable material and of any desired form, but is preferably of wood and rectangular in cross-section, and comprises sides 4 and 5 and end walls 6 and 7. The seed-chamber 3 is preferably cylindrical in form and composed of sheet metal bent to shape and bolted or otherwise secured to the lower end of the body portion 2. This chamber extends laterally beyond the wall 5 of the hopper a short distance for the purpose hereinafter explained, and the outer end of this extended portion is closed by a disk 8, preferably of wood.

9 indicates a horizontal shaft which extends centrally through the seed-chamber and has fixedly mounted thereon a ground-wheel 10.

11 is an agitator-disk which is also mounted upon the shaft within the extended portion of the seed-chamber. This agitator and the ground-wheel are connected for simultaneous rotation by means of a suitable core or member 12, which is cylindrical in cross-section and is provided with a head 14, which lies against the inner side of the wheel, and with a body portion which extends through and is journaled for rotation in a bearing-opening formed centrally through the disk 8.

15 indicates connecting-bolts which extend through the wheel, member, and agitator for maintaining the parts in secure assemblage.

The shaft 9 projects laterally beyond the outer side of the ground-wheel 10 and is journaled in a bearing 16, connected to the main frame 17 of the machine. This main frame consists, preferably, of a single length of strap metal which is bent to form a side bar 18, which lies at the outer side of the ground-wheel, a journal 19, which lies directly in front of the ground-wheel, and a brace-bar 20, which is attached by bolts or otherwise to the hopper 1.

21 is a vertical standard which is mounted at its upper end in the bearing 19 and has pivoted to its lower end a recessed member 22, to which is attached for vertical adjustment a furrow-opening blade 23. The member 22 is preferably of strap metal bent to shape to form a longitudinal slot, which receives the connecting-bolt of the blade, and an upwardly-extended vertical arm 24, provided with a series of perforations 25, one of which receives the outer end of a link 26, to the inner end of which is attached a spring 27, connected by a link 28 with an integral depending perforated ear 29, formed upon the rear end of the side bar 18. By this construction the plow-blade may yield readily to override roots or other obstructions.

30 indicates a draft-bar which at its inner end is pivotally mounted upon the standard 21 and which is provided at its outer end with a suitable clevis 31, having a series of vertically-disposed perforations, which permit of the draft being regulated, as usual.

32 is a pivoted frame composed, preferably, of strap metal bent into shape to form side bars 33, which are pivoted at their forward ends to the frame-bar 18 and brace member 20, respectively, and a rear bar 34, to which is adjustably attached covering-blades 35.

36 indicates a seed-discharge opening formed at the under side of the seed-chamber 3. The size of this opening may be varied for regulating the discharge of seed therefrom by means of an adjuatable plate 37, secured to the inner side of the seed-chamber by means of set-screws, which engage suitable transverse slots formed in the wall of the chamber.

38 is a seed-receiver, preferably composed of sheet metal and of semicircular form in cross-section. This receiver is bolted to the under side of the seed-chamber directly beneath the discharge-opening in position to receive the material which is discharged therefrom.

39 indicates a series of sheet-metal members removably secured to the inner face of the ground-wheel 10 and provided each with a suitable finger or blade 40. As the wheel 10 rotates the fingers 40 pass successively through the receiver 38 to discharge therefrom the accumulated seed, and in this connection it is to be noted that the spacing between the hills varies according to the number of and spacing between the members 39. Hence the distance between the hills may be readily varied as circumstances require by providing the ground-wheel with a greater or lesser number of the members 39.

From the foregoing it will be seen that I produce a simple device which in practice will efficiently perform its functions, and in attaining these ends it is to be understood that I do not limit or confine myself to the precise details herein shown and described, inasmuch as various minor changes may be made therein without departing from the spirit or scope of my invention.

Having thus described my invention, what I claim is—

1. In a device of the class described, the combination with a seed-chamber having a discharge-opening, of a stationary receiver associated with the chamber beneath the discharge-opening, a rotary wheel arranged adjacent to the receiver, and members carried and operable by said wheel to discharge seed from the receiver.

2. In a device of the class described, the combination with a seed-chamber having a discharge-opening, of a stationary receiver associated with the chamber beneath the discharge-opening, a rotary ground-wheel, and members carried and operable by the ground-wheel to discharge seed from the receiver.

3. In a device of the class described, the combination with a seed-chamber having a discharge-opening, of means for regulating the discharge of seed from the opening, a stationary receiver associated with the chamber beneath the discharge-opening, a rotary ground-wheel, and members removably attached to the ground-wheel and operable thereby to discharge seed from the receiver.

4. In a device of the class described, the combination with a seed-chamber having a discharge-opening, of a stationary receiver associated with the chamber beneath the discharge-opening, a rotary shaft, an agitator mounted upon the shaft within the chamber, a rotary ground-wheel mounted upon the shaft, and members carried and operable by the ground-wheel to discharge seed from the receiver.

5. In a device of the class described, the combination with a seed-chamber having a discharge-opening, of an adjustable plate operable to regulate the size of the opening, a stationary receiver associated with the chamber beneath the discharge-opening, a rotary shaft, an agitator fixedly mounted upon the shaft within the chamber, a rotary ground-wheel fixedly mounted upon the shaft for operating the same and the agitator, and members carried and operable by the ground-wheel to discharge seed from the receiver.

In testimony that I claim the foregoing as my own I have hereto affixed my signature in the presence of two witnesses.

WILLIAM F. EDWARDS.

Witnesses:
 JOHN R. BIRD,
 J. W. STEPHENSON.